Figure 1:
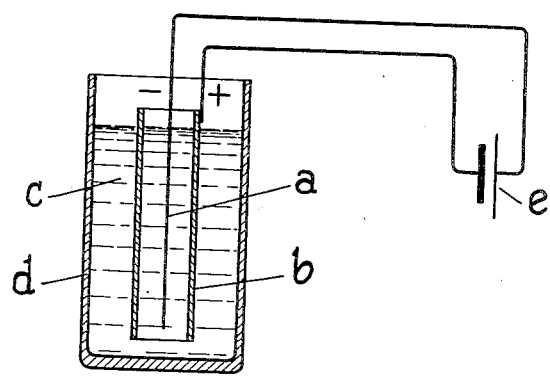

Feb. 14, 1933.  E. HARSÁNYI  1,897,902
METHOD OF COATING RADIANT BODIES
Filed March 14, 1928

Inventor:
Eugene Harsányi
By Emil Bonnelycke
Attorney

Patented Feb. 14, 1933

1,897,902

UNITED STATES PATENT OFFICE

EUGENE HARSÁNYI, OF BUDAPEST, HUNGARY

METHOD OF COATING RADIANT BODIES

Application filed March 14, 1928, Serial No. 261,707, and in Germany March 14, 1927.

The radiant bodies of electric radiant energy for example the cathodes of thermionic or electron discharge tubes or the anticathodes of X-ray tubes must be made of metals having as high melting point and as high atomic weight as possible.

These metals, especially tungsten and molybdenum as preferably used, present however great working difficulties so that it would be in many cases advantageous to manufacture the radiant bodies from metals which can be easily worked, for example, rolled or stamped and to provide these bodies with a thin coating of tungsten, molybdenum, tantalum or a mixture of these metals. As yet however no suitable methods are known for electrolytic deposition of these metals from their compounds.

It is further often desirable to provide the surface of radiant bodies of the above kind with a coating of non-metallic compounds for example of oxides especially oxides of alkaline earth metals.

However no general method suitable for all of said oxides or their mixtures is known for producing a uniform coating of such compounds.

My invention relates to a method for producing radiant bodies of the kind set forth by coating said bodies with metals or metal compounds having very high melting points such as tungsten or oxides of alkaline earth metals or a mixture of these substances.

According to my invention the metallic radiant body to be coated is dipped into a colloidal liquid dispersion of the substances intended for coating, and is subjected to an electric charge of opposite potential from that taken by the inner phase of the dispersion against its outer phase.

If for example the inner phase of the dispersion, that is to say the dispersed particles, take a positive charge, the metal to be coated will be connected as a cathode, and a second electrode dipped into the liquid will be connected as an anode to an electric current source.

In the electric field produced thereby, the dispersed particles, owing to the electrophoretic action of the current, migrate towards the cathode and deliver their electric charge to this latter, while the discharged particles form a strongly adherent uniform coating on the depositing electrode.

It is advisable to add to the dispersion suitable protecting colloids, for example glue.

As electrolysis takes place simultaneously with the electrophoresis, and as the liberated gases at the depositing electrode would impair the homogeneity of the deposit, either such a low terminal voltage, for example 2 volts, must be used in order that no electrolytic decomposition of water may take place, or suitable depolarizing means must be used at the depositing electrode which will combine with the gas to form ions. Another possibility is to use an electrolyte which does not yield gaseous ions at the depositing electrode.

Cathodes for thermionic valves can be manufactured by depositing for example oxide of barium on a thin wire of platinum or nickel or an alloy of these metals in the following manner:

The carbonate of the desired alkaline earth metal, or a mixture of said carbonates, is suspended in an alcohol, preferably in methyl alcohol, and carbon dioxide is conducted through said suspension. A methyl compound of the alkaline earth carbonate is formed which is filtered and thereupon mixed with water, whereby a colloidal dispersion of the carbonate of the alkali earth metal will be obtained. The wire to be coated is thoroughly cleaned and dipped into this dispersion and connected as a cathode to an electric current source. The wire to be coated is surrounded by a tubular anode. A terminal voltage of 2 volts is used to produce the cathophoretic deposit.

It is advisable, particularly in coating platinum wires, to roughen the surface of the wire, for example by dipping the wire as an electrode into an electrolytic bath, and using preferably alternating current.

I have found it advantageous to provide the platinum wire, before depositing the oxides, with an electrolytic coating of a metal easily oxidized, for example copper, and oxidize it by heating.

The wire provided with a coating of colloidal carbonates must be heated to incandescence in order to transform the carbonates into oxides. The incandescence must be started very carefully in order to avoid the melting of the carbonates.

The wires can be coated in small lengths or by continuously leading the wire through the electrophoretic bath.

Wires can be coated in the described manner with a mixture of different oxides or with a mixture of metals and oxides.

Another example of my invention consists in depositing on the surface of a thin metal wire, for example of platinum or nickel, metallic tungsten from its colloidal dispersion. The wire coated in this manner can be drawn to its original thickness and provided with a second electrophoretic tungsten deposit. This process can be repeated until the original wire core practically disappears. In this manner not only wires of pure tungsten but of mixtures of metals or of metals containing other substances can be obtained, which could not be drawn without a ductile core. For such purposes, instead of a colloidal dispersion of pure tungsten, a dispersion of several different metals, for example tungsten and titanium, or a dispersion of metals and metal compounds, for example of tungsten and metal oxides, or carbonates, for example thorium oxide, will be used. In this manner thoriated tungsten wires can be produced with a higher thorium content than obtainable hitherto. Again, tungsten wires may be produced containing a plurality of different oxides, for example thorium oxide and cerium oxide.

Instead of carbonates, any other compounds, for example organic compounds of the metals, can be used in dispersion which yield oxides on being heated to incandescence.

Instead of using water as dispersion liquid, any other suitable liquid, for example methyl alcohol, may be used for preparing the dispersions.

Figure 2:
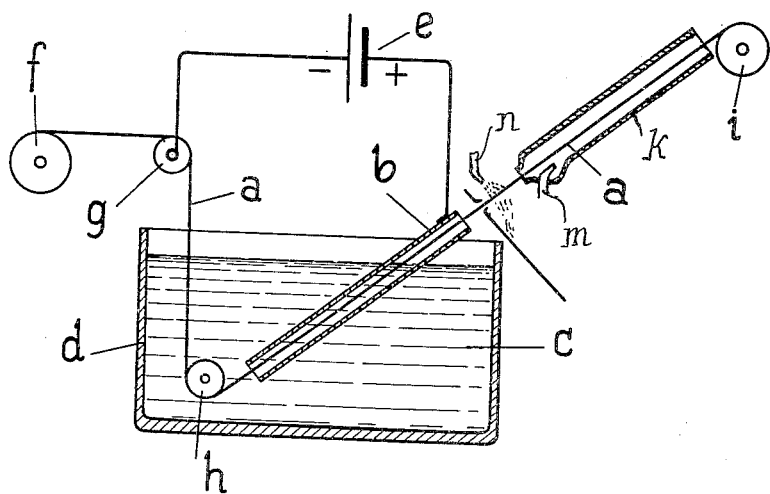

In the accompanying drawing, Figures 1 and 2 are vertical sectional views of two forms of apparatus which can be used in carrying out my invention.

Referring to Fig. 1, $d$ indicates a receptacle containing the dispersion $c$, and $a$ indicates the metallic body, wire for example, which is to be coated and which is dipped into said dispersion; $b$ indicates a tubular electrode surrounding the wire $a$, and $e$ indicates a source of electric current, one terminal of which is connected to the wire $a$ and the other terminal to the electrode $b$.

Fig. 2 shows an apparatus for enabling continuous coating of the wire. $f$ indicates a supply roll from which the wire $a$ is led over a metallic roller $g$ to an insulating roller $h$ submerged in the dispersion $c$. The wire $a$ is conducted in an oblique direction through the dispersion $c$, and the tubular electrode $b$ surrounding the wire is also arranged obliquely. $i$ indicates a roll upon which the coated wire is wound. The current source $e$ is connected at one terminal to roller $g$, and through the intermediary of said roller to wire $a$, while the other terminal is connected to electrode $b$. $k$ indicates a tube into which hot air is conducted through nozzle $m$ in order to dry the coated wire, and $n$ indicates a nozzle through which water is sprayed upon the wire to remove the dispersion adhering to the wire as it emerges from the bath.

Having now particularly described and ascertained the nature of my said invention and in what manner the same is to be performed, I declare that what I claim is:

1. A method of coating bodies for use in radiant energy devices and the like, comprising the steps of dipping two metallic conductors into an aqueous liquid containing a colloidal dispersion of a metallic substance which is insoluble in such liquid; said conductors forming the terminals of an electric circuit, and one of them constituting the body to be coated; passing an electric current through said circuit to deposit the metallic substance in dispersion on the surface of said body electrophoretically; and preventing electrolytic decomposition of the liquid.

2. A method of coating bodies for use in radiant energy devices and the like, comprising the steps of dipping two metallic conductors into an aqueous medium containing a colloidal dispersion of a metallic substance which is insoluble in such medium; said conductors forming the terminals of an electric circuit, and one of them constituting the body to be coated; and passing an electric current having a terminal voltage low enough to prevent decomposition of the electrolyte and consequent release of ions at the depositing electrode, through said circuit to deposit the metallic substance in dispersion on the surface of said body electrophoretically.

3. A method of coating bodies for use in radiant energy devices and the like, comprising the steps of dipping two metallic conductors into an aqueous medium containing a colloidal dispersion of a metallic substance which is insoluble in such medium; said conductors forming the terminals of an electric circuit, and one of them constituting the body to be coated; and passing an electric current having a terminal voltage of 2 volts through said circuit to deposit the metallic substance in dispersion on the surface of said body electrophoretically.

4. A method as set forth in claim 1, including the step of roughening the surface of the metallic conductor to be coated, which comprises dipping said conductor into an electrolytic bath previous to subjecting it to the electrophoretic coating.

5. A method as set forth in claim 1, including the step of roughening the surface of the metallic conductor to be coated, which comprises dipping said metallic conductor into an electrolytic bath and subjecting it to the action of an alternating current previous to subjecting it to the electrophoretic coating.

6. A method of coating bodies for use in radiant energy devices and the like, comprising the steps of electrolytically coating the body with a metal different from the finally desired coating, oxidizing said electrolytic coating, and electrophoretically depositing a coating on the body from a colloidal dispersion containing metallic compounds which constitute the desired final coating.

In testimony whereof I affix my signature.

EUGENE HARSÁNYI.